United States Patent [19]
Fevre et al.

[11] Patent Number: 6,092,957
[45] Date of Patent: Jul. 25, 2000

[54] SYSTEM EMPLOYING A BRACKET TO OBTAIN SECURE ENGAGEMENT OF A HOLDING DEVICE FOR A SYSTEM FOR CLAMPING TWO MEMBERS

[75] Inventors: Laurent Fevre, Saint Sulpice; Jean-Christophe Bodin, Saint Ouen; Alain Carrer, Vendome, all of France

[73] Assignee: Lemforder Nacam SA, Vendome, France

[21] Appl. No.: 09/141,597

[22] Filed: Aug. 28, 1998

[30] Foreign Application Priority Data

Sep. 5, 1997 [FR] France .................................. 97 11206

[51] Int. Cl.[7] ........................................................ F16B 2/00
[52] U.S. Cl. ............................ 403/373; 74/493; 74/527; 280/775; 403/107; 403/110; 403/374.5
[58] Field of Search ...................... 74/493, 527; 280/775; 403/104, 105, 106, 107, 110, 373, 374.1, 374.2, 374.5, DIG. 4, DIG. 8

[56] References Cited

U.S. PATENT DOCUMENTS

| | | | |
|---|---|---|---|
| 5,338,064 | 8/1994 | Sadakata et al. ..................... 74/493 X |
| 5,570,610 | 11/1996 | Cymbal ..................................... 74/493 |
| 5,722,299 | 3/1998 | Yamamoto et al. ..................... 74/493 |
| 5,743,150 | 4/1998 | Fevre et al. .............................. 74/493 |
| 5,758,545 | 6/1998 | Fevre et al. ......................... 280/775 X |
| 5,787,759 | 8/1998 | Olgren ..................................... 74/493 |
| 5,921,577 | 7/1999 | Weiss et al. ........................... 280/775 |
| 5,927,152 | 7/1999 | Marzio et al. ............................ 74/493 |

*Primary Examiner*—Anthony Knight
*Assistant Examiner*—Danielle Somrak
*Attorney, Agent, or Firm*—Laubscher & Laubsch

[57] ABSTRACT

A holding device hold a first member in position relative to a second member on a clamping pin. Two racks respectively one connected to the first and second members and adapted to interengage in a locked position. A return spring separates the racks in an unlocked position. An additional spring co-operates with a bracket. The racks, return spring and additional spring are mounted on the clamping pin. The additional spring bears against the bracket and operates on the mobile rack to assure complete interpenetration of the mobile rack and the fixed rack. The main application of the device is to automobile vehicle steering columns.

15 Claims, 7 Drawing Sheets

SYSTEM EMPLOYING A BRACKET TO OBTAIN SECURE ENGAGEMENT OF A HOLDING DEVICE FOR A SYSTEM FOR CLAMPING TWO MEMBERS

BACKGROUND OF THE INVENTION

1. Field of the Invention

The present invention concerns the secure engagement of a holding device for a system for clamping two members. The clamping system has a clamping pin that passes through each of the two members. This secure engagement arrangement for a holding device is applicable in particular to an automobile vehicle steering column, the steering column being adjustable in height and/or in depth in the vertical plane.

2. Description of the Prior Art

In an adjustable automobile steering column, the system for adjusting the height in the vertical plane or the depth in the vertical plane requires the position chosen by the driver to be maintained. In prior art devices there is provision for adding to the clamping system of the position adjustment system a device with metallic teeth connected to each of the two members to be clamped so that the metallic teeth come into contact with each other to guarantee that the chosen position is maintained. The teeth are on the one hand on a fixed rack forming part of the support member and on the other hand on a rack mounted on the mobile adjustment system. In certain heightwise adjustment positions the tops of the teeth of the mobile rack can come into contact with the tops of the teeth of the fixed rack when the device is being locked. The rack system is then in a position of unstable equilibrium, leading to two situations:

- the tops of the teeth remain in equilibrium, the locking system cannot operate, and it is impossible to lock the column adjustment system;
- on application of additional force to the operating lever, the tops of the teeth leave this unstable position and take up a position in the gaps between teeth, so that the system can be locked. However, this movement from the equilibrium state to the locked state is accomplished with a slight impact within the rack system and this causes a cracking noise and a "hard point" feeling in the operating lever. Although they have no effect on the functioning of the locking system, these phenomena are perceived as being disagreeable and can therefore be considered unacceptable. Such phenomena compromise the mechanical strength of the device and make the driver feel insecure.

OBJECTS OF THE INVENTION

The main object of the present invention is to propose a secure engagement system for a holding device for a system for clamping two members. The secure engagement of the holding device applies in particular to the clamping system an adjustment system for an automobile vehicle steering column.

Another object of this invention is to provide a holding device which avoids the drawbacks described hereinabove and which is easy to integrate into existing steering columns in a manner that guarantees that the clamping system concerned will be held in position.

SUMMARY OF THE INVENTION

In accordance with the invention, the secure engagement system for holding a first member in position relative to a second member has a structure in which the first member and the second member, considered fixed, are connected by a clamping system. The clamping system has a clamping pin passing through the two members.

The holding device comprises a rack mounted against the second member, called as a fixed rack, and a rack connected to the first member, called as a mobile rack, so that the mobile rack and the fixed rack can interengage in a locked position of the clamping system. The clamping pin passes through the mobile rack and the fixed rack. A return spring is disposed between the fixed and mobile racks to cause separation of the racks in an unlocked position of the clamping system.

The holding device is characterized in that it comprises:

- additional spring means mounted on the clamping pin against the mobile rack and on the same side as a clamping means mounted on an end of the clamping pin;
- a bracket mounted on the clamping pin between the additional spring means and the clamping means; and
- the additional spring means and the bracket being shaped and adapted so that in the locked position of the clamping system:
  the bracket bears against the second member, and
  the additional spring means bears against the bracket disposed against the clamping means, and operates on the mobile rack to assure complete interpenetration of the mobile rack and the fixed rack.

In accordance with the invention, the holding device with the secure engagement system advantageously includes a bracket the structure of which is described hereinafter.

A base of the bracket has flanges disposed extending at ends of the base. The two flanges are substantially perpendicular to this base whereby the bracket has a U-shape section. The base also comprises a hole through which the clamping pin passes.

The two flanges of the bracket are at a distance from each other greater than the width of each of the fixed and mobile racks so that the mobile rack connected to the first member can be mounted in the bracket and, in the locked position of the clamping system, the flanges of the bracket surround the fixed rack mounted against the second member and bear on the second fixed member to obtain positive abutment of the clamping system.

More particularly according to the invention, the additional spring means comprises a cup-shape compression spring. This additional spring is mounted on the pin of the clamping system and is accommodated in the bracket between the base of the bracket and the mobile rack connected to the first member.

In the foreseen arrangement in the invention, the return spring disposed between the two racks is a leaf spring which has a hole for the clamping pin to pass through in a central portion which is disposed against the mobile rack connected to the first member. The leaf spring has also flexible curved portions on respective opposite sides of this central portion, the flexible curved portions bearing on the fixed rack mounted against the second member. The leaf spring comprises also two tongues which extend to the mobile rack connected to the first member so that the two tongues engage respectively into notches made in the mobile rack to couple the return spring in rotation to the mobile rack.

The holding device with a secure engagement according to the invention can notably be applied to an automobile steering column. In this structure the first member is a body tube of an automobile vehicle steering column, the column being adjustable in at least one of the heightwise and depthwise adjustment directions in the vertical plane;

a steering shaft is mounted to rotate freely in the body tube;

the second member is a support member attached to the chassis of the vehicle;

in an adjustment system for adjusting the position of the steering column, the body tube or first member is disposed in the support member or second member, the clamping system is in the unlocked position, the first member is placed at a required position relative to the second member by the adjustment system, and the first member is immobilized relative to the second member in the locked position by the clamping system.

In a prefered embodiment of the invention, the fixed rack which is fixed to the second member or support member, is the fixed rack which is constituted by a plate which has:

- a bearing face which is provided with positioning studs for positioning it into the second member;
- two contact faces which are oriented in the adjustment direction and which are disposed on respective opposite sides of an oblong hole through which the pin of the clamping system can pass and allowing movement of the clamping pin during positional adjustment; and
- two paths which are provided with teeth, the paths being oriented in the adjustment direction and extending along the contact faces respectively.

The mobile rack which is connected to the first member consists of a plate which has:

- a hole through which the clamping pin passes,
- a bearing face for the additional spring means,
- two contact faces for the return spring disposed around the hole,
- two paths provided with teeth, oriented in the adjustment direction and extending along the contact faces respectively, and
- two opposite central notches adapted to receive the two tongues of the return spring respectively.

A particularly interesting embodiment of the racks according to the invention consist in that each of the fixed and mobile racks comprises asymmetric teeth. Each of the teeth has two flanks which are very slightly inclined to a plane perpendicular to the contact rack faces. The flanks of each tooth shape an flank angle less than the angle corresponding to a coefficient of friction between the two racks.

Moreover according to the invention, it is particularly interesting that the two paths of each rack have teeth whose flank angles are opposed in order to oppose any longitudinal force to the racks, i.e. any upward or downward vertical force.

According to the invention, the mobile rack and the fixed rack can be made of sintered steel. The fixed rack can also be made in an other variant of a thermoplastics material reinforced with glass fibers.

According to the invention, the additional spring means can be made on different forms of compression spring: a cupel, at least one spring washer called "Belleville" washer, a cylindrical coil spring, a conical coil spring, or a compression leaf spring.

The secure engagement system of the holding device of a system for clamping two members in accordance with the invention provides radial and/or axial adjustment and eliminates the tooth-on-tooth and cracking problems encountered in existing systems and the "hard point" sensation felt in the operating lever.

BRIEF DESCRIPTION OF THE DRAWINGS

The foregoing and other objects, features and advantages of the invention will be apparent from the following detailed description of several preferred embodiments of the invention with reference to the corresponding accompanying drawings in which.

DESCRIPTION OF THE PREFERRED EMBODIMENTS

As shown in FIGS. 1 through 7 the holding device hold a first member 1 in position relative to a second member 2 considered fixed, the member 1 and the member 2 being connected by a clamping system 3. The clamping system 3 has a clamping pin 4, such as a threaded rod, which passes through the members 1 and 2. The holding system proper comprises a rack 8 which is mounted against the second member 2 considered fixed and is referred to as the fixed rack 8, and a rack 7 which is connected to the first member 1 and is referred to as the mobile rack 7. The clamping pin 4 passes through the mobile rack 7 and the fixed rack 8. The racks 7 and 8 are adapted and disposed to interengage in a locked position. A return spring 9 is disposed between the mobile rack 7 and the fixed rack 8 to cause the racks 7 and 8 to urge apart in an unlocked position shown in FIGS. 3 and 4.

Figure 2:
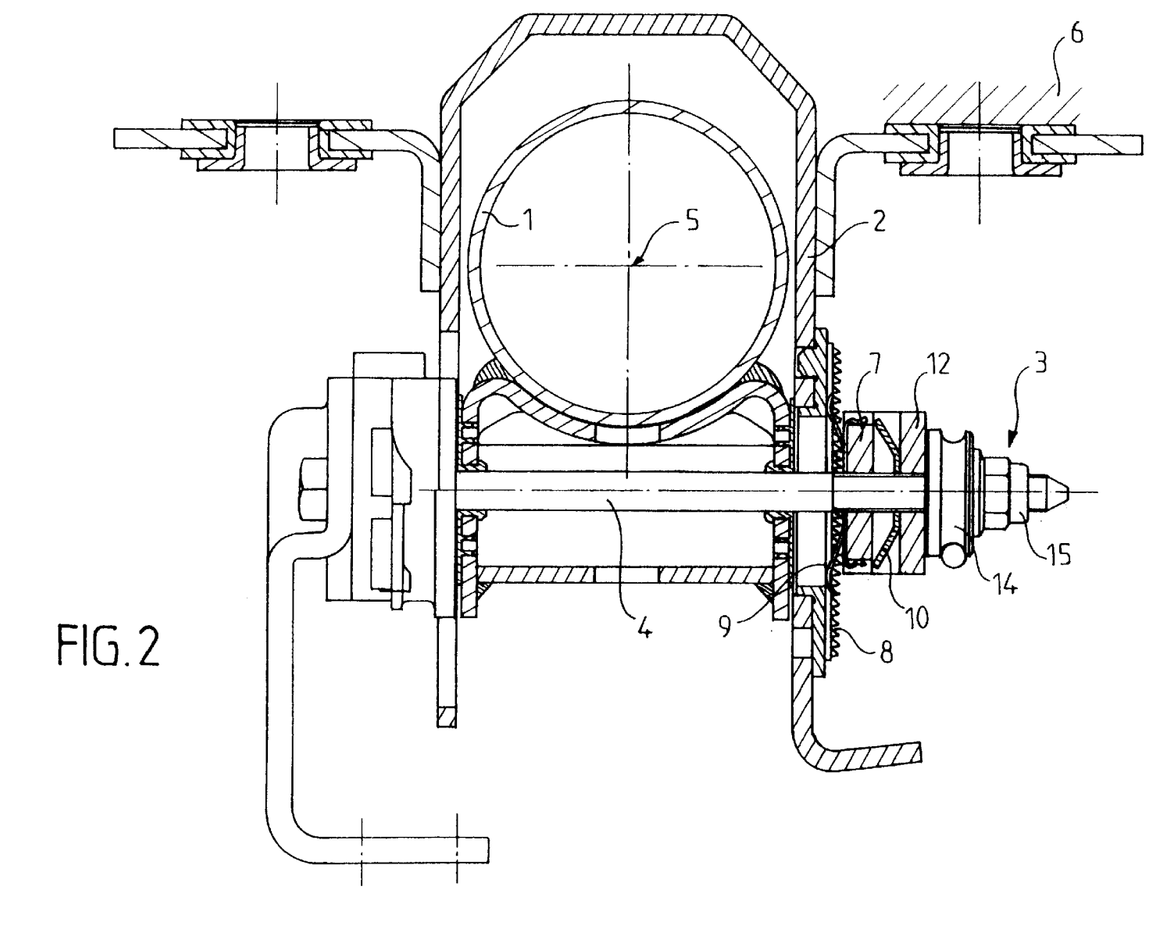
FIG. 2 is a view in section taken along the line II—II in FIG. 1, of the clamping system in a locked position.
Figure 3:
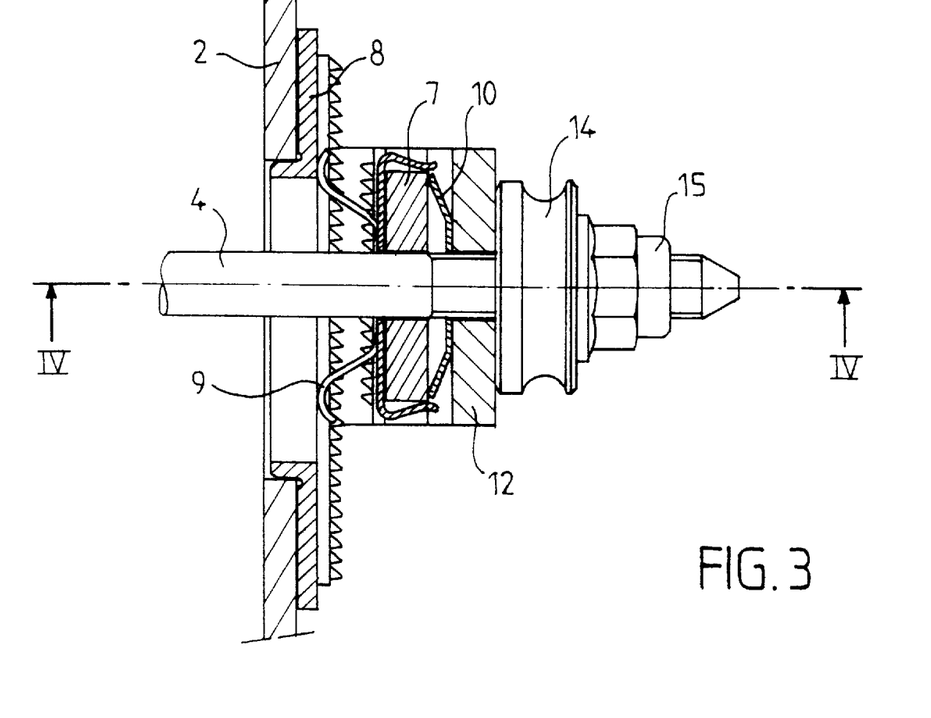
FIG. 3 is a partial sectional view corresponding to FIG. 2, of the clamping system in an unlocked position.
Figure 4:
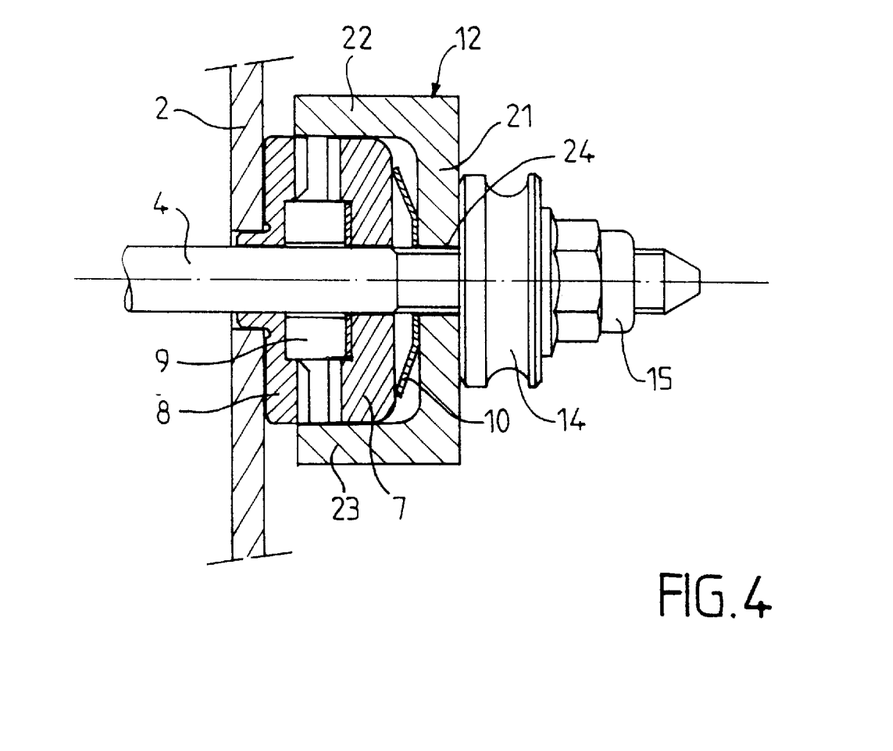
FIG. 4 is a view taken in section along the line IV—IV in FIG. 3.
Figure 5:
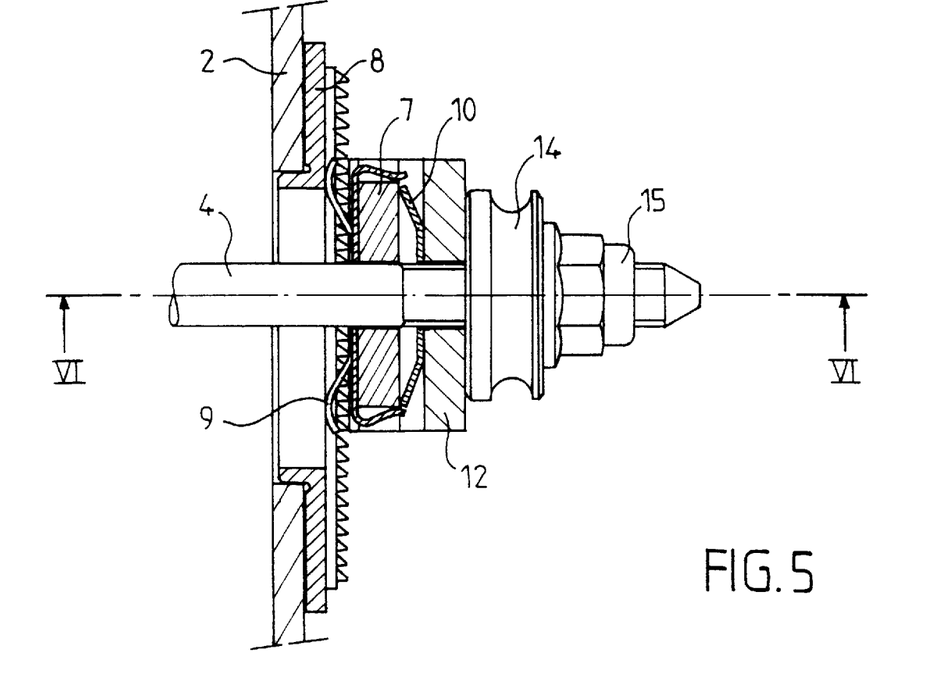
FIG. 5 is a sectional view similar to FIG. 3, of the clamping system in the locked position.
Figure 6:
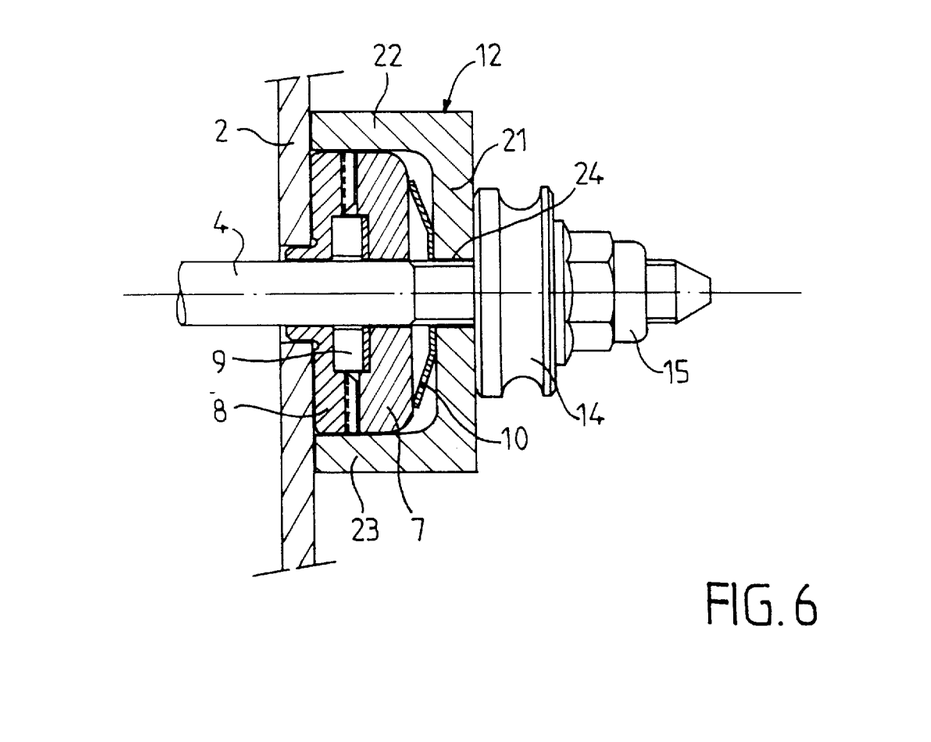
FIG. 6 is a view in section taken along the line VI—VI in FIG. 5.

Secure engagement of the holding device is assured by additional spring means 10 that co-operate with a bracket 12. The additional spring means 10 and the bracket 12 are both mounted on the pin 4 of the clamping system 3. The additional spring means 10 are disposed against the mobile rack 7 mounted on the pin 4 of the clamping system 3, and on the same side of an assembly 14–15 with bearing and nut mounted on a threaded end of the pin 4 as the clamping system 3. The bracket 12 is disposed between the additional spring means 10 and the assembly 14–15 with bearing and nut mounted on the threaded end of the pin 4 of the clamping system 3. The additional spring means 10 therefore bear on the one hand against the bracket 12 and on the other hand against the mobile rack 7. The additional spring means 10 and the bracket 12 are shaped and adapted so that, in the locked position of the clamping system 3 shown in FIGS. 2, 5 and 6:

the bracket 12 bears against the support member 2, the additional spring means 10 bear against said bracket 12 disposed against the bearing and nut assembly 14–15, and the additional spring means 10 operate on the mobile rack 7 to assure complete penetration of the mobile rack 7 into the fixed rack 8.

Figure 1:
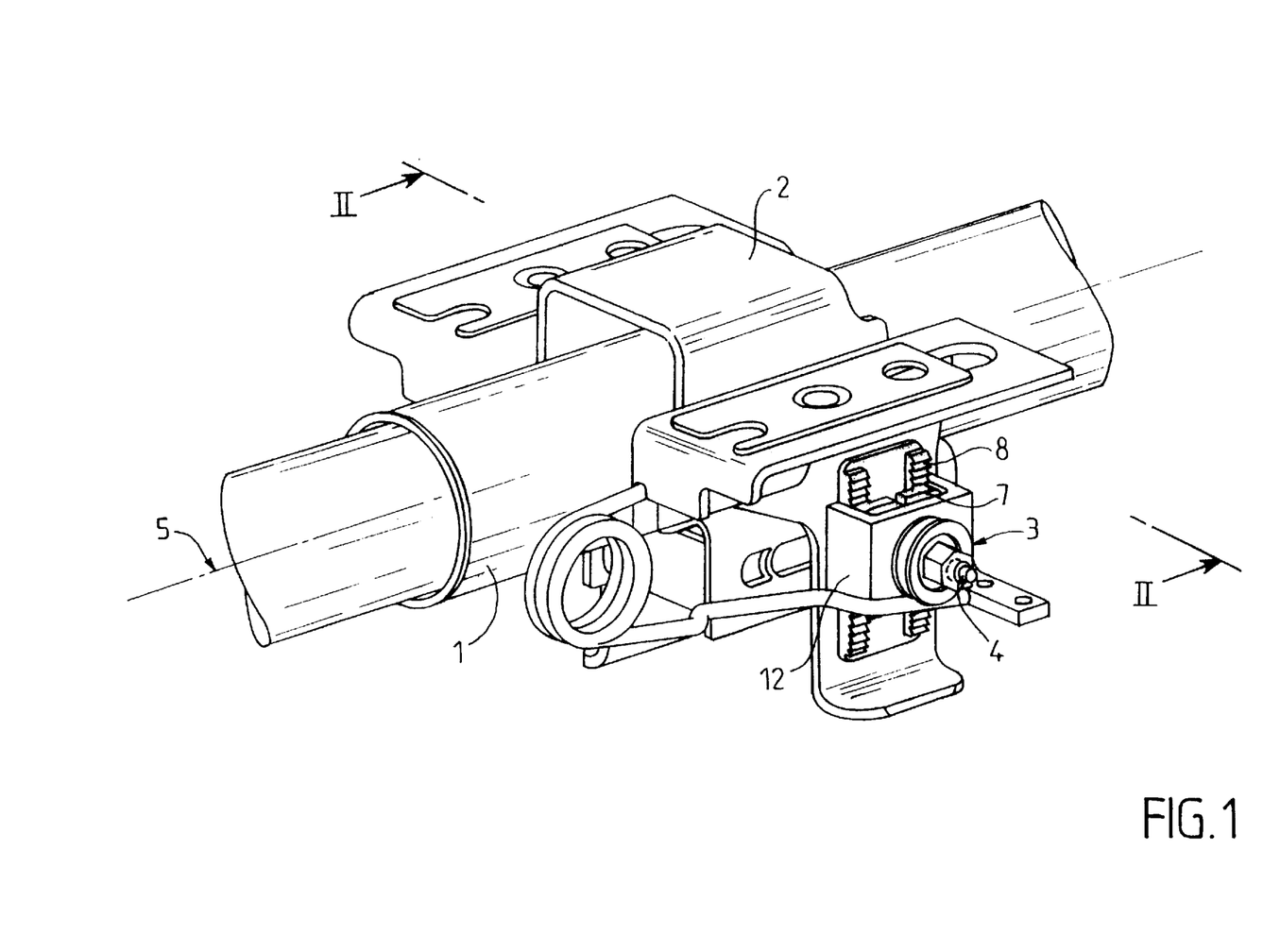
FIG. 1 is a perspective view of a secure engagement system in accordance with the invention relating to a holding device of a system for clamping two members which are parts of an automobile vehicle steering column.

The holding device in accordance with the invention applies in particular to an automobile vehicle steering column shown in FIGS. 1 and 2, in which:

the first member 1 is an automobile vehicle steering column body tube, said column being adjustable in height and/or in depth in the vertical plane;

a steering shaft 5 is mounted to rotate freely inside the body tube;

the second member 2 is a support member fixed to the body of the vehicle 6;

an adjustment system for adjusting the position of the steering column is adapted so that the body tube 1 is disposed in the support member 2, the clamping system is in the unlocked position, the member 1 is placed in the desired position relative to the member 2 by means of the adjustment system, and the member 1 is immobilized relative to the member 2 in the locked position by the clamping system 3.

As shown in FIGS. 3 to 6 in particular, the bracket 12 of the invention has a base 21 in which there is a hole 24 for the clamping pin 4 to pass therethrough. A respective flange 22, 23 is provided at each end of the base 21. The two flanges 22 and 23 are substantially perpendicular to the base 21 so that the bracket is U-shape. The two flanges 22 and 23 are at a greater distance from each other than the width each of the two racks 7 and 8. This is so that the mobile rack 7 connected to the member 1 can be mounted in the housing of the bracket 12 and so that when the clamping system 3 is immobilized in the locked position, the flanges 22 and 23 of the bracket 12 surround the fixed rack 8 mounted against the member 2 and press against the member 2 to obtain a positive clamping abutment as shown in FIGS. 2, 5 and 6.

The additional spring means 10 comprises a cup-shaped compression spring. The additional spring 10 is mounted on the pin 4 of the clamping system 3 and is accommodated in the bracket 12 between the base 21 of the bracket 12 and the mobile rack 7 connected to the member 1 and mounted on the pin 4 of the clamping system 3. The additional spring 10 therefore bears on the one hand against the base 21 of the bracket 12 and on the other hand against the mobile rack 7.

Figure 8:
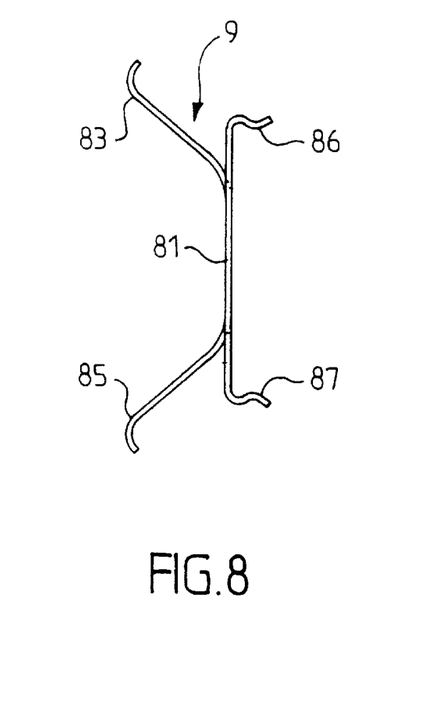
FIG. 8 is a view of a return spring.
Figure 9:
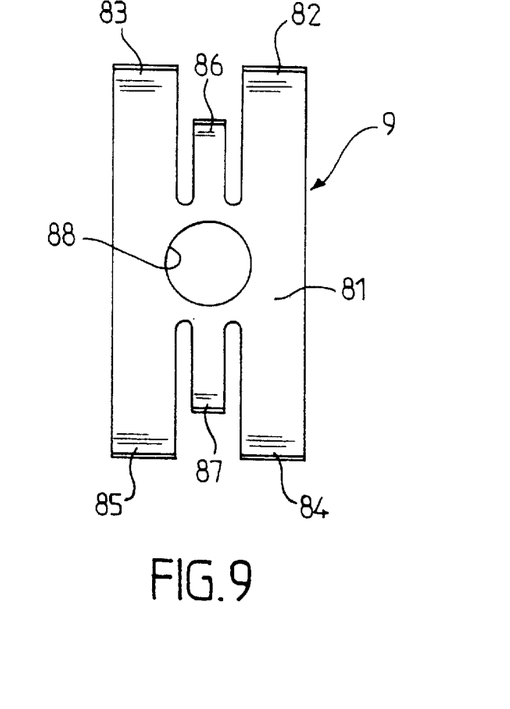
FIG. 9 is a right side elevation view of the return spring from FIG. 8.

The return spring 9 is located between the fixed rack 8 and the mobile rack 7 to allow and to assure spreading apart of the two racks 7 and 8 when the clamping system 3 is in the unlocked position. As shown in FIGS. 8 and 9, the return spring 9 is a leaf spring. The leaf spring incorporates a hole 88 through which the clamping pin 4 passes. The hole 88 is in a central portion 81 of spring 9 disposed against the mobile rack 7 connected to the member 1. The leaf spring 9 has flexible curved portions 82, 83, 84 and 85 around and on either side of the central portion 81. The flexible curved portions 82, 83, 84 and 85 bear on the fixed rack 8 mounted against the member 2. The return spring 9 includes two tongues 86 and 87 on the side of the mobile rack 7 connected to the member 1. The tongues 86 and 87 are located on respective opposite sides of the central portion 81 and respectively between the flexible curved portions 82 and 83 and the flexible curved portions 84 and 85. The ends of the tongues 86 and 87 respectively engage in notches 49 and 50 (FIGS. 12 and 13) made in sides of the mobile rack 7 to effect rotational coupling of the return spring 9 to the mobile rack 7.

Figure 10:
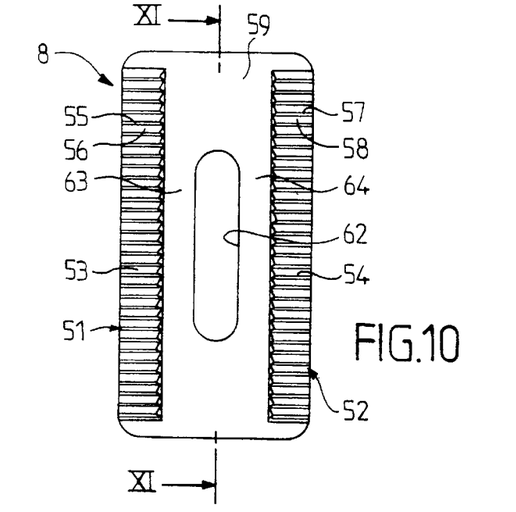
FIG. 10 is a view of a fixed rack shown in FIGS. 1 through 7.
Figure 11:
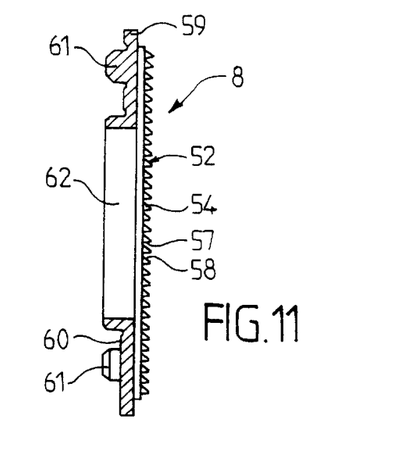
FIG. 11 is a view in section taken along the line XI—XI in FIG. 10.

The construction of the fixed rack 8 in accordance with the invention is shown in FIGS. 10 and 11. The fixed rack 8, which is mounted against the support member 2, comprises a plate 59 which includes:

a bearing face 60 provided with positioning studs 61 for positioning it onto the member 2, two contact faces 63 and 64 which are oriented in the adjustment direction and which are situated on respective opposite sides of an oblong hole 62 through which the pin 4 of the clamping system 3 passes and which enables movement of said pin 4 during adjustment of position;

two paths 51 and 52 with teeth 53 and 54, each of the paths 51 and 52 being oriented in the adjustment direction and formed along the respective contact face 63, 64.

Figure 12:
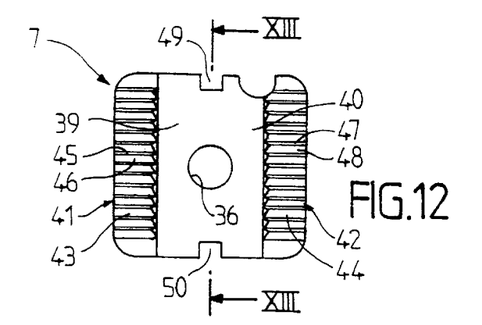
FIG. 12 is a view of a mobile rack shown in FIGS. 1 through 7.
Figure 13:
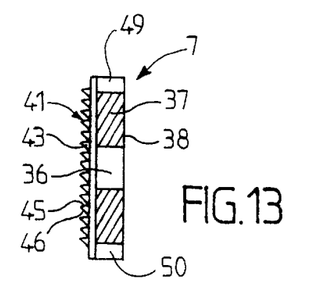
FIG. 13 is a view in section taken along the line XIII—XIII in FIG. 12.

The construction of the mobile rack 7 is shown in FIGS. 12 and 13. The mobile rack 7 which is connected to the member 1 comprises a plate 37 which includes a hole 36 through which the clamping pin 4 passes. The plate 37 has on the one hand a bearing face 38 for the additional spring 10 and on the other hand two contact faces 39 and 40 for the return spring 9. The two contact faces 39 and 40 are disposed around the hole 36. The rack proper comprises two paths 41 and 42 with respective teeth 43 and 44. Each of the paths 41 and 42 is oriented in the adjustment direction and runs along the corresponding contact face 39 and 40. The two central notches 49 and 50 opposite each other are adapted to receive the two tongues 86 and 87 of the return spring 9.

In the locked position shown in FIGS. 2, 5 and 6 tension is supplied to the threaded rod which constitutes the clamping pin 4 of the clamping system 3. This tension can be applied by a cam device. The tension is transmitted to the bracket 12 via the bearing and nut assembly 14–15 mounted at the threaded end of the clamping pin 4 of the clamping system 3 and which includes a nut 15 and a needle thrust bearing 14. This tension presses the bracket 12 against the upright of the support member 2.

In the normal locked position shown in FIGS. 2, 5 and 6, and when the bracket 12 is pressed against the upright of the support member 2, the additional spring 10 pushes the mobile rack 7 against the fixed rack 8. The force applied to the mobile rack 7 by the additional spring 10 being greater than the force produced by the return spring 9, the mobile rack 7 meshes completely within the fixed rack 8 and this assures positive locking of the clamping system.

Figure 7:
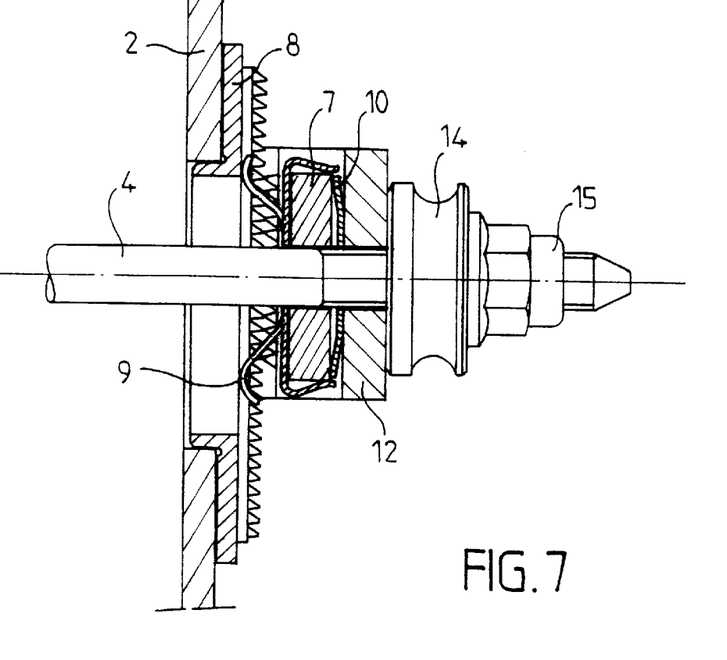
FIG. 7 is a sectional view similar to FIG. 5, of the clamping system in the locked position with racks in tooth-on-tooth contact.

FIG. 7 shows the situation in which, the system being in locked position, the mobile rack 7 and the fixed rack 8 are in tooth-to-tooth contact. If, on locking, the teeth of the racks 7 and 8 are in a position such that they remain in equilibrium with the tips of one set of teeth on the tips of the other teeth, it is the additional spring 10 that is compressed. The bracket 12 is then pressed against the upright of the support member 2, without applying any significant force to the teeth of the racks and without transmitting any feeling of binding into the operating lever. Slight movement of the bracket 12, for example at the onset of an impact in the event of an accident, causes the teeth of the racks 7 and 8 to move from their position of unstable equilibrium to a position of stable equilibrium. This position of stable equilibrium corresponds to the position with the tops of the teeth within the gaps between teeth. This movement is obtained by virtue of the action of the additional spring 10, which has remained compressed. The system is then in a positive locked position.

When the clamping system is unlocked the clamping threaded rod 4 moves, which separates the nut 15 from the upright of the support member 2 a sufficient distance. The return spring 9 separates the two racks 7 and 8 to enable their relative movement without contact between their teeth. The mobile rack 7 is pressed against the additional spring 10 which is itself pressed against the base 21 of the bracket 12.

In the locked position, the mobile rack 7 is pressed against the fixed rack 8 by the additional spring 10. In the event of a sufficient vertical force, and if the angle of the rack teeth is large, the clamping system can be reversible, i.e locking would no longer be positive. To this end, and in accordance with the invention, it is beneficial to provide asymmetric rack teeth, as described hereinafter.

Figure 14:
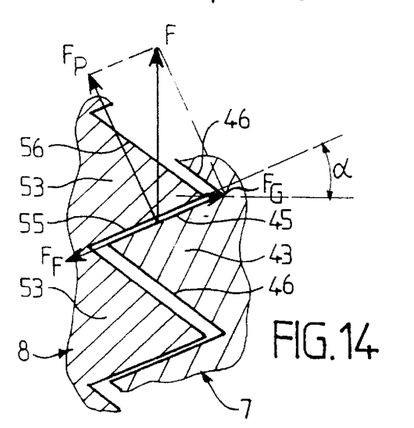
FIG. 14 is a detail view of the rack teeth.

To assure positive locking combined with a tooth profile facilitating meshing, a tooth angle is chosen such that friction assures irreversibility. Accordingly, the coefficient of friction of the mobile rack 7 on the fixed rack 8 is represented by the tangent of an angle $\phi$. We define $\alpha$ as the angle at which the flanks of the teeth are very slightly inclined to the plane perpendicular to the contact faces 39 and 40 or 63 and 64. Referring to FIG. 14, the following equations then apply $$F_F > F_G \Longrightarrow \tan\phi \cos\alpha . F > \sin\alpha . F$$

$$\tan\phi > \tan\alpha$$

$$\phi > \alpha,$$

where

F: vertical thrust force $F_G$: sliding force associated with profile of teeth $F_G = \sin\alpha . F$ $F_F$: friction force $F_F = \tan\phi . F_P = \tan\phi . \cos\alpha . F$ The coefficient of friction ordinarily being in the range 0.1 to 0.4, i.e. $\phi$ being in the range 6° to 20°, a tooth angle of 5° is chosen.

For practical reasons of manufacture and strength, a symmetrical tooth with a 5° half-angle at the top should be avoided, so an asymmetric tooth is chosen, like that shown in FIG. 14.

The teeth are oriented so that the clamping system assures positive locking when the force is in a vertically upwards direction, which corresponds to the impact situation.

Positive locking in the event of a downward force is assured by the adhesion of the reinforcing square to the upright of the support member, and this is normally sufficient.

Figure 15:
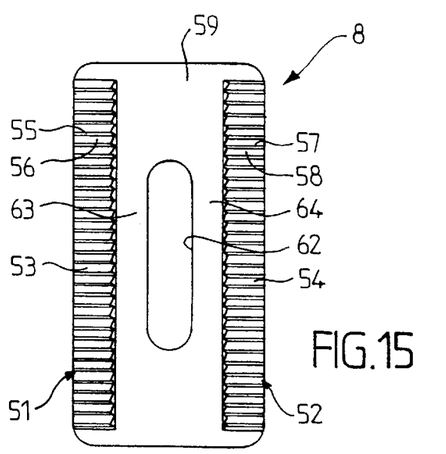
FIG. 15 is view analogous to FIG. 10 of another embodiment of the fixed rack.

To further improve the benefit of the invention, the racks can be adapted so that the two paths of each rack have teeth 43 and 44, 53 and 54 in which the angles of the tooth flanks 45 and 46, 55 and 56 in the one 41, 51 of the rack paths are opposed to the angles of the tooth flanks 47 and 48, 57 and 58 in the other rack path 42, 52. This opposes any vertical force, i.e. any force in the longitudinal direction of the racks, whether oriented upwards or oriented downwards. FIG. 15 shows one example of one of the racks of this kind.

In other embodiments of the invention the mobile rack 7 and the fixed rack 8 are made of sintered steel. The fixed rack 8 can equally be made of a thermoplastics material reinforced with glass fibers or the likes.

Figure 16:
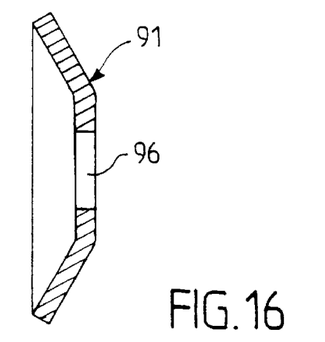
FIG. 16 is a sectional view of a first embodiment of an additional spring means.
Figure 17:
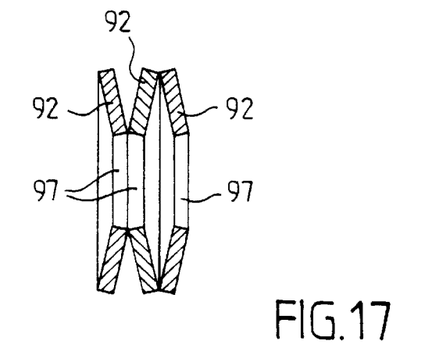
FIG. 17 is a sectional view of another embodiment of the additional spring means.
Figure 18:
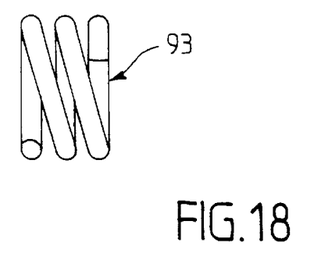
FIG. 18 is a side view of a third embodiment of the additional spring means.
Figure 19:
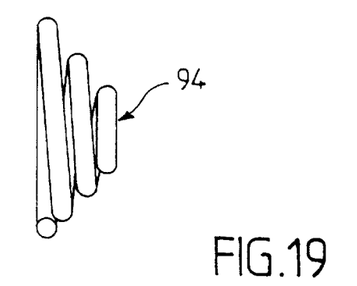
FIG. 19 is a side view of a fourth embodiment of the additional spring means.
Figure 20:
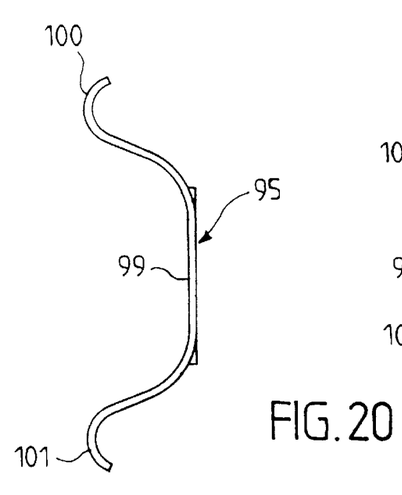
FIGS. 20 and 21 are side and face view of a fifth embodiment of the additional spring means in the form of a leaf spring.
Figure 21:
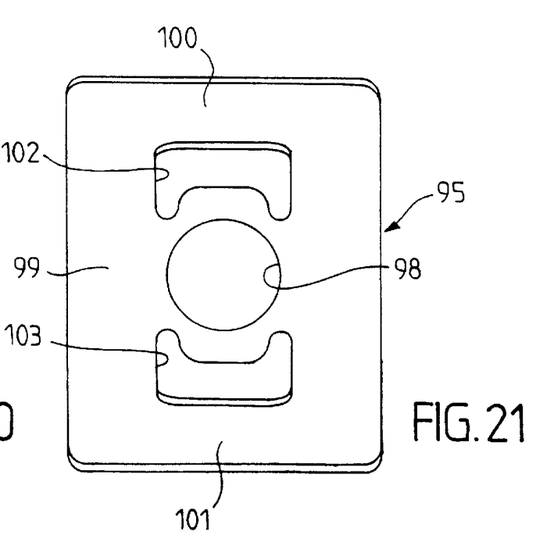

The additional spring means 10 can be compression springs of different shapes: a cup 91 with a hole 96 as shown in FIG. 16, spring washers known as "Belleville" washers 92 with a pin-passing hole 97 as shown in FIG. 17, a cylindrical compression coil spring 93 as shown in FIG. 18, a conical coil compression spring 94 as shown in FIG. 19, or a compression leaf spring 95 as shown in FIGS. 20 and 21. The spring 95 has:

a hole 98 in a central portion 99 through which the clamping pin 4 passes, and flexible curved portions 100 and 101 located on respective opposite sides of the central portion 99 and each including a slot 102 or 103.

What we claim is:

1. A holding device for clamping a moveable first member (1) to a stationary second member (2), comprising:

(a) a mobile first rack (7) adapted for connection with the first member, and a stationary second rack (8) adapted for connection with the second member;

(b) clamping means for displacing said racks together toward an engaged condition, said clamping means including a clamping pin (4) extending at one end through aligned openings contained in said first and second racks, said clamping pin having an enlargement (14.15) at its other end;

(c) return spring means for biasing said first and second racks apart toward a disengaged condition, said return spring means including a return spring (9) arranged between said racks;

(d) a bracket (12) mounted for movement on said clamping pin adjacent said clamping enlargement; and (e) additional spring means for biasing said racks together toward said engaged condition, said additional spring means including an additional spring (10) arranged between said bracket and said mobile first rack;

(f) said additional spring means and said bracket being so arranged and shaped that when said racks are in said locked condition:

(1) said bracket is in engagement with said second member; and (2) said additional spring means bears against said bracket and biases said mobile second rack toward engagement with said first rack.

2. The holding device claimed in claim 1, wherein said bracket comprises a U-shape section including:

(a) a base containing a hole through which said clamping pin passes, and (b) flanges extending at the ends of said base substantially perpendicular to said base, (c) said flanges being at a distance from each other greater than the width of each of said racks so that said mobile rack can be mounted in said bracket, and (d) in said locked position of said clamping system, said flanges of said bracket surrounding said fixed rack to obtain positive abutment of said clamping system.

3. The holding device claimed in claim 2 wherein said additional spring means comprise a cup-shape compression spring which is mounted on said clamping pin and which is accommodated in said bracket between said base of said bracket and said mobile rack.

4. The holding device claimed in claim 1, wherein said return spring disposed between said racks comprises a leaf spring including:

(a) a central position containing a hole through which said clamping pin passes, said central portion being disposed against said mobile rack, (b) flexible curved portions on respective opposite sides of said central portion, said flexible curved portions bearing on said fixed rack, and (c) two tongues extending toward said mobile rack so that said two tongues engage respectively into notches defined in said mobile rack, thereby to couple said return spring in rotation to said mobile rack.

5. The holding device claimed in claim 1, wherein said first member comprises the body tube of an automobile vehicle steering column, said column being adjustable in at least one of the heightwise and depthwise adjustment directions in said vertical plane; and further including:

(a) a steering shaft mounted to rotate freely in said body tube;

(b) said second member comprising a support member; and (c) an adjustment system for adjusting position of said steering column, when said first member is disposed in said second member, and when said clamping system is in said unlocked position, whereby when said first member is placed at a required position relative to said second member by said adjustment system, said first member is immobilized relative to said second member in said locked position by said clamping system.

6. The holding device claimed in claim 5, wherein said fixed rack which is mounted against said second member comprises a plate having:

(a) a bearing face which is provided with studs for positioning it into said second member;

(b) two contact faces which are oriented in the adjustment direction and which are disposed on respective opposite sides of an oblong hole through which said clamping pin passes, thereby allowing movement of said clamping pin during positional adjustment; and (c) two paths with teeth, oriented in said adjustment direction and extending along said contact faces respectively.

7. The holding device claimed in claim 5 wherein said mobile rack which is connected to said first member is a plate which has:

a hole through which said clamping pin passes, a bearing face for said additional spring means, two contact faces for said return spring disposed around said hole, two paths with teeth, oriented in the adjustment direction and extending along said contact faces respectively, and two opposite central notches adapted to receive said two tongues of said return spring respectively.

8. The holding device claimed in claim 5 wherein said fixed rack which is mounted against said second member is a plate which has:

a bearing face which is provided with studs for positioning it into said second member, two contact faces which are oriented in the adjustment direction and which are disposed on respective opposite sides of an oblong hole through which said clamping pin passes and allowing movement of said clamping pin during positional adjustment, and two paths with teeth, oriented in said adjustment direction and extending along said contact faces respectively; and said mobile rack which is connected to said first member is a plate which has:

a hole through which said clamping pin passes, a bearing face for said additional spring means, two contact faces for said return spring disposed around said hole and opposite to said two contact faces of said fixed rack, two paths with teeth, oriented in the adjustment direction, extending along said contact faces respectively, and cooperating with said tooth paths of said fixed rack, and two opposite central notches adapted to receive said two tongues of said return spring respectively;

each of said racks comprising asymmetric teeth each having flanks which are very slightly inclined to a plane perpendicular to said contact rack faces and which shape of a flank angle less than the angle corresponding to a coefficient of friction between said two racks.

9. The holding device according to claim 8 characterized in that said two paths of each rack have teeth whose flank angles are opposed in order to oppose in a longitudinal direction of said racks.

10. The holding device claimed in claim 1 wherein said mobile rack and said fixed rack are made of sintered steel.

11. The holding device claimed in claim 1 wherein said fixed rack is made of a thermoplastics material reinforced with glass fibers.

12. The holding device claimed in claim 1 wherein said additional spring means comprises a compression spring in said form of a Belleville spring washer.

13. The holding device claimed in claim 1 wherein said additional spring means comprises a cylindrical compression coil spring.

14. The holding device claimed in claim 1 wherein said additional spring means comprises a conical compression coil spring.

15. The holding device claimed in claim 1 wherein said additional spring means comprises a compression leaf spring which has two flexible curved portions.

* * * * *